UNITED STATES PATENT OFFICE.

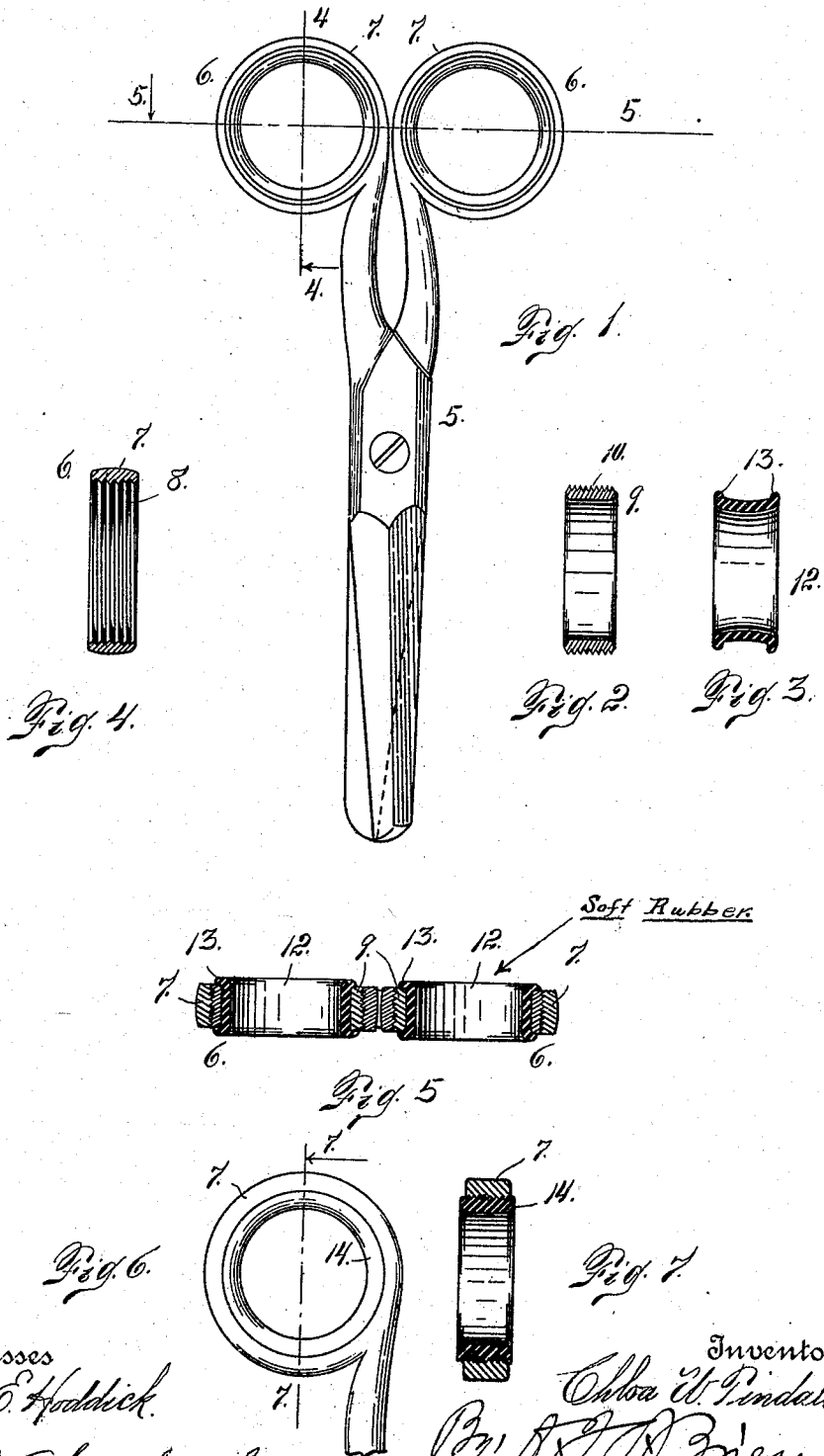

CHLOA W. TINDALL, OF DENVER, COLORADO.

HANDLE FOR SHEARS OR SCISSORS.

No. 923,734.    Specification of Letters Patent.    Patented June 1, 1909.

Application filed May 15, 1908. Serial No. 432,988.

*To all whom it may concern:*

Be it known that I, CHLOA W. TINDALL, a citizen of the United States, residing in the city and county of Denver and State of Colorado, have invented certain new and useful Improvements in Handles for Shears or Scissors; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in handles for shears or scissors, my object being to equip the loops or eyes with which the shears or scissors are provided, with an elastic lining or inside covering, whereby these loops shall be soft and pliable to the hand of the user, and to this end I provide each loop with a bushing composed of rubber, or similar elastic material or composition, which may be applied to a metal ring which may be screwed into the loop or eye of the handles.

Having briefly outlined my improved construction, I will proceed to describe the same in detail, reference being made to the accompanying drawing, in which is illustrated an embodiment thereof.

In this drawing, Figure 1 is an elevation of a pair of scissors equipped with my improvements. Fig. 2 is a sectional view of a metal ring adapted to be screwed into an eye or loop of the scissors handle. Fig. 3 is a sectional view of the rubber bushing adapted to be applied to the metal bushing, shown in Fig. 2. It is assumed that both of these elements are shown in place in Fig. 1. Fig. 4 is a section taken on the line 4—4, Fig. 1, with the bushing elements shown in Figs. 2 and 3, removed. Fig. 5 is a section taken on the line 5—5, Fig. 1. Fig. 6 is a view illustrating one of the scissors loops, showing the rubber bushing applied directly thereto. Fig. 7 is a section taken on the line 7—7, Fig. 6.

The same reference characters indicate the same parts in all the views.

Let the numeral 5 designate a pair of scissors, and 6 each of the two metal loops with which the handles are provided. Referring first to Figs. 1 to 5 both inclusive, let the numeral 7 designate the loop or ring portion of each handle interiorly threaded, as shown at 8, to receive a metal bushing 9, which is exteriorly threaded, as shown at 10, to screw thereinto. A rubber bushing 12 is applied to the metal bushing 9 interiorly, the edges of the rubber bushing being bent outwardly, as shown at 13, to overlap and partially conceal the corresponding edges of the metal bushing (see Figs. 1 and 5), thus completely covering the metal part of the loop or eye, and preventing the hand of the user from coming in direct contact with the metal.

In assembling the different elements of this form of construction, it will be understood that the loops or eyes 7 of the handles, are first interiorly threaded, after which the metal bushing 9 is applied to the loop by screwing it thereinto, each of the loops, of course, being correspondingly or identically equipped. The lining or bushing 12 is then applied to the metal bushing 9. If desired, however, the metal loop or ring 7 may be of the construction shown in Fig. 7, and a rubber bushing member 14 screwed directly thereinto. It will thus be seen that in either case, the eyes, rings or loops of the scissors or shears, are equipped with a rubber or elastic lining or bushing which is soft and pliable to the hand of the user, thus making the use of the device much less troublesome than is the case with ordinary shears or scissors, or those unequipped with my improvement.

Attention is called to the fact that the member 12, instead of being made of rubber, may be composed of felt or other suitable material, which may be attached either directly to the inner surface of the eyes or loops of the shear handles, or may be attached to metal rings which may be screwed into the said loops. It is evident that felt, or other suitable soft lining, or bushing, for the loops or eyes of these handles, may be attached thereto by cement, or any other suitable material.

If the rubber bushing shown in Fig. 3 is employed, it may have either one or two ribs 13, formed on its outer edge, as may be desired. If only one of these ribs is employed, it will be necessary to secure the bushing within the ring 9 by cement or other adhesive substance in order to maintain the bushing securely in place.

If the form shown in Fig. 3 is used, it should be applied to the metal ring 9 after the latter has been inserted in the loop or eye of the shear handle, since one of the ribs 13, would interfere with its insertion.

Having thus described my invention, what I claim is:

1. Handles for shears or scissors, including loops or eyes interiorly threaded, threaded rings screwed into the loops or eyes of the scissors, and yielding bushings applied to the metal rings interiorly.

2. Handles for shears or scissors, including loops interiorly threaded, threaded metal rings screwed into the said loops and rubber bushings detachably applied to the metal rings, substantially as described.

In testimony whereof I affix my signature in presence of two witnesses.

CHLOA W. TINDALL.

Witnesses:
P. J. EDWIN ROBINSON,
DAISY F. HUGHES.